June 12, 1945.  R. I. FELVER ET AL  2,378,073
TOASTING APPARATUS
Filed May 4, 1943   3 Sheets-Sheet 1

WITNESSES:
RJ Ridge
E. H. Lutz

INVENTOR
RICHARD I. FELVER, AND
BERNARD F. PARR.
BY
ATTORNEY

INVENTOR
RICHARD I. FELVER, AND
BERNARD F. PARR.
BY
ATTORNEY

INVENTOR
RICHARD I. FELVER, AND
BERNARD F. PARR
BY
ATTORNEY

Patented June 12, 1945

2,378,073

UNITED STATES PATENT OFFICE 2,378,073

TOASTING APPARATUS

Richard I. Felver and Bernard F. Parr, Mansfield, Ohio, assignors to Westinghouse Electric & Manufacturing Company, East Pittsburgh, Pa., a corporation of Pennsylvania Application May 4, 1943, Serial No. 485,630

13 Claims. (Cl. 99—328)

Our invention relates to automatic toasters and has for an object to provide improved apparatus of this kind.

A further object of the invention is to initiate operation of a toaster and to select the degree of toasting or the color of the toast by the actuation of a control device movable to a plurality of selective positions.

A further object of the invention is to provide improved control means for a toaster actuated by an electromotor, said control means being movable to selective positions for varying the period of toasting and for initiating operation of the toaster.

Another object of the invention is to provide an improved toaster having a plurality of push buttons selectively operated for initiating operation of the toaster and for varying the period of toasting.

These and other objects are effected by our invention as will be apparent from the following description and claims taken in connection with the accompanying drawings, forming a part of this application, in which:

Figure 1:
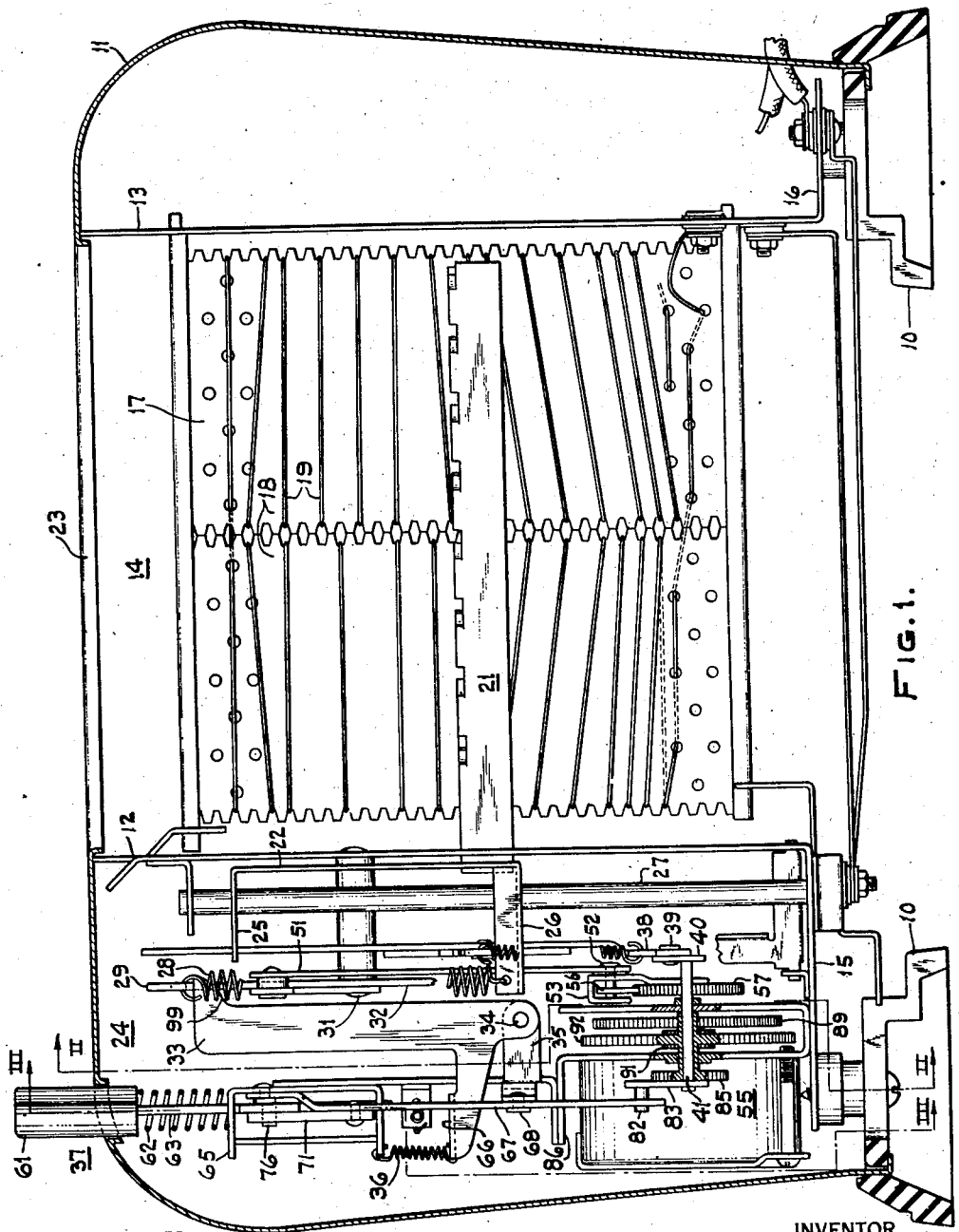
Fig. 1 is a sectional view taken longitudinally through a toaster constructed and arranged in accordance with the invention.

Reference will now be had to the drawings wherein we have elected to show the invention applied to an oven type toaster including a base member 10 and a housing 11 supported thereon. The interior of the housing 11 is provided with two transverse wall members 12 and 13 which define a toasting oven 14. The wall members 12 and 13 have respective horizontally-extending portions 15 and 16 which are secured to the base 10. Arranged within the oven 14 are a plurality of heating elements, one of which is shown at 17. The heating elements are of well understood construction and include strips of mica 18 upon which a heating coil 19 is wound. As the construction and operation of heating elements of the type shown at 17 are well known in the art, no further description of the same is deemed necessary.

A bread-supporting member 21 forming a part of a carriage structure 22 is arranged intermediate a pair of the heating elements 17 and is movable from its bread-receiving position, shown in the drawings, downwardly into toasting position, as will be described hereinafter. The casing 11 is provided with one or more openings 23 through which the bread is inserted and removed. As is well understood, these openings 23 are aligned above the bread-supporting member 21.

In accordance with our invention, the mechanism for actuating the bread carrier 21 between its upper and lower positions is arranged within a compartment 24 and will now be described. The bread carriage 22 includes horizontally-extending portions 25 and 26 which are provided with openings for receiving stationary vertical rods 27 carried by the wall structure 12 and, upon which rods 27, the carriage slides. During inactive periods, the carriage 22 is retained in its upper position by a tension spring 28, the lower end of which is attached to the horizontally-extending portion 26 of the carriage 22 and the upper end of which is supported by a bellcrank lever 29 carried by a pivot 31 supported upon the wall structure 12. The bellcrank lever 29 includes a leg 32 which carries a pin 33 for a purpose to be described hereinafter. The bellcrank 29 is supported during inactive periods by a latch 33 which is pivoted, as shown at 34, to a stationary bracket 35. The latch 33 is biased clockwise about its pivot 34 by means of a tension spring 36, as clearly shown in Fig. 1.

Figure 2:
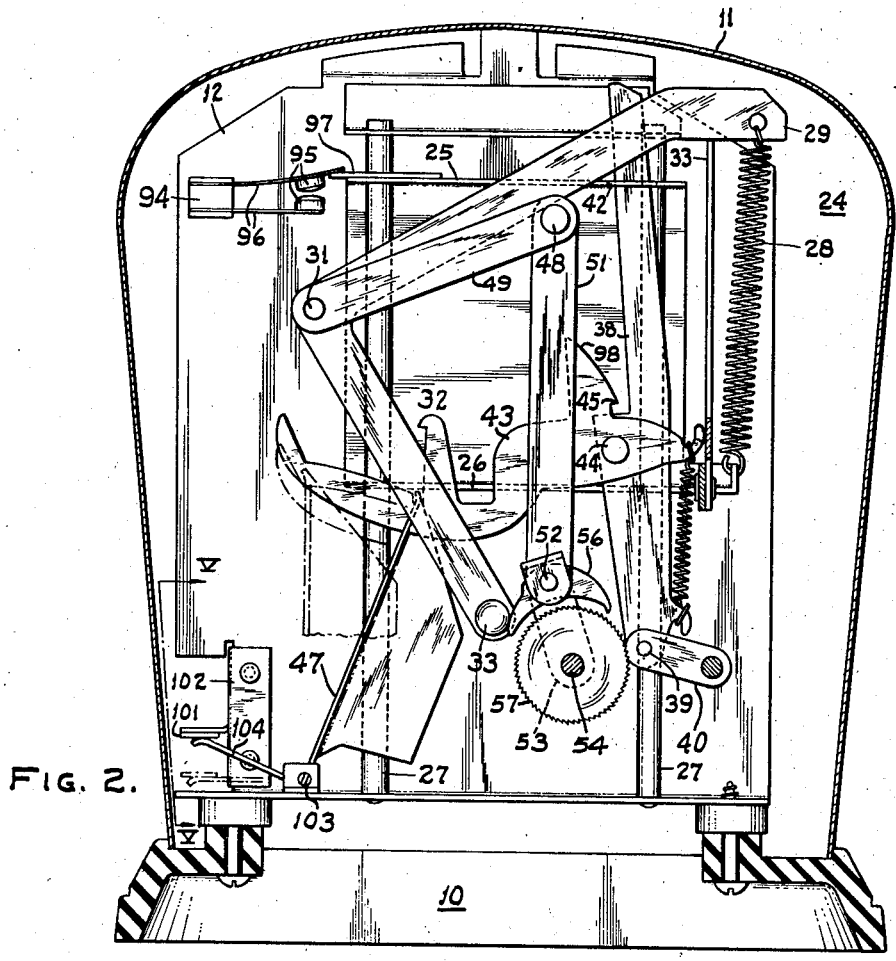
Figs. 2 and 3 are sections taken along the respective lines II—II and III—III of Fig. 1.

The bread carriage 22 is actuated to its lower or toasting position by means of a push button mechanism, generally indicated at 37 and described in detail hereinafter. When any one of the buttons of the mechanism 37 is actuated, the latch 33 is moved counter-clockwise about its pivot 34 from beneath the bellcrank 29, whereupon the bellcrank 29 swings clockwise about its pivot 31 and the carriage 22 and the spring 28 fall by gravity to a lower position. When in the lower or toasting position, the carriage 22 is latched in place by a mechanism including a vertically-extending lever 38 which is pivoted, as shown at 39, to an arm 40 fixed to a shaft 41. The upper horizontally-extending portion 25 of the carriage 22 is provided with a slot 42 through which the lever 38 projects. The carriage 22 is locked in its lower position by a trigger 43 pivoted, as shown at 44, to the lever 38 and having a projection 45 which engages the upper side of the horizontal portion 25 of the carriage 22 when the latter is in its lower position. A tension spring 46 engaging the lever 38 and trigger 43, as best shown in Fig. 2, biases the trigger 43 at all times clockwise about its pivot 44. Movement of the trigger 43 about the pivot 44 is, however, restrained by a pivoted restraining member 47 which may form a part of a thermostatically-operated compensating device, to be referred to hereinafter. During the actuation of the carriage 22 to its lower position, the arm 40 is moved counterclockwise, as viewed in Fig. 2, by means actuated by the push button mechanism 37, and which will be described later. Accordingly, the lever 38 and the pivot 44 of the trigger 43 will be depressed to a lower position than that shown in Fig. 2 when the carriage 22 is locked down.

During the downward movement of the carriage 22 and the clockwise movement of the bellcrank 29, the latter engages a roller 48 carried by an arm 49 which is pivoted on the pivot 31. The free end of the arm 49 is pivotally connected to the upper end of a link 51. The lower end of the link 51 is pivoted, at 52, to an arm 53 loosely carried by a shaft 54 so that it may move about the shaft 54. Both shafts 41 and 54 are rotated by a motor-driven mechanism, generally indicated at 55, during the toasting period in a manner to be described later. The pivot pin 52 functions to pivotally support a pawl 56, which is engageable with a ratchet wheel 57 fixed to the shaft 54. The pawl 56 is biased clockwise about its pivot 52 at all times by a suitable spring, not shown for the sake of clearness. In the position of the apparatus shown in the drawings, the pawl 56 is in engagement with the pin 33 and thereby maintained out of engagement with the ratchet wheel 57. When the bell crank 29 is moved clockwise about its pivot 31, the pin 33 will be moved to the left, as viewed in Fig. 2, clear of the pawl 56 so that the latter is moved into engagement with the ratchet wheel 57. During clockwise movement of the bellcrank 29, and downward movement of the link 51, the arm 53 is moved counterclockwise about the shaft 54 to its lower deadcenter position, the pawl 56 riding over the teeth of the ratchet wheel during this movement. During operation of the motor-driven mechanism 55, the pawl 56 is driven by the ratchet 57 in counterclockwise direction.

Figure 3:
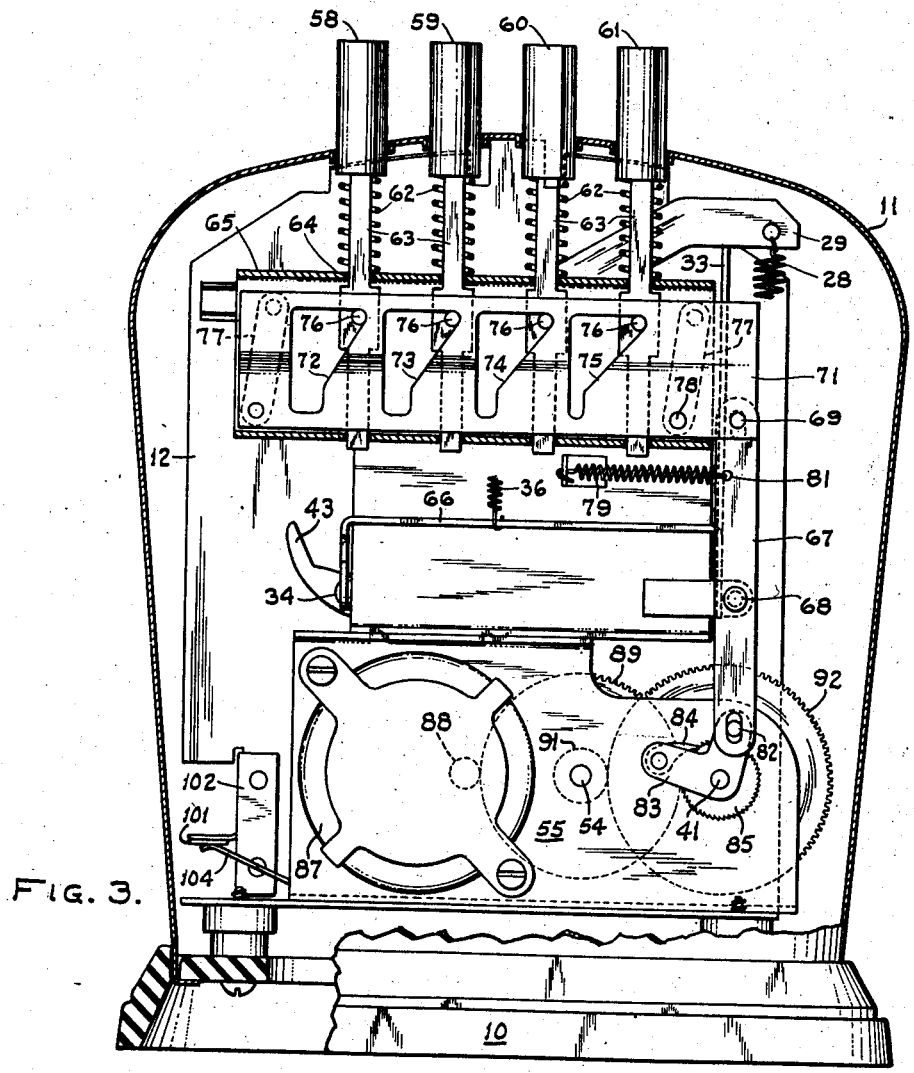

The push button mechanism 37 includes a plurality of push buttons 58 to 61, inclusive, which may be selectively actuated for varying the degree of toasting or the color of toast desired. In the present embodiment, the push buttons are selectively operated to vary the period of time that the carriage 22 is retained in its toasting position. The push buttons 58 to 61, inclusive, project through the housing 11 and are biased upwardly at all times by respective compression springs 62. The push buttons 58 to 61 are provided with respective push rods 63 which are guided in openings 64 formed in a stationary bracket 65. The lower ends of the push rods 63 are engageable with an elongated plate 66 forming a part of the latch 33, as best shown in Figs. 1 and 3. It will be noted that when any one of the buttons 58 to 61 is depressed, its push rod 63 will engage the surface 66 and force the latch 33 counterclockwise about its pivot 34, whereupon the bellcrank 29 is released. When released, the push button is returned to its former position, as shown in Fig. 3, and the spring 36 is then effective to actuate the latch 33 to the position shown in the drawings.

As mentioned heretofore, the arm 40 and shaft 41 are moved counterclockwise during the lowering of the carriage 22. The mechanism for effecting this movement includes a lever 67 carried by a stationary pivot 68 and connected at its upper end by means of a pin-and-slot connection 69 to a cam plate 71. The cam plate 71 is provided with a plurality of cam surfaces 72 to 75, inclusive, which are engageable with respective pins 76 carried by the push rods 63.

From Fig. 3, it will be noted that, when a push button is depressed, its pin 76 will force the cam plate 71 to the right as the pin 76 rides along its associated cam surfaces 72 to 75. The slope of the cam surfaces 72 to 75 vary, so that the amount of movement imparted to the cam plate 71 will vary, depending upon which button is depressed. It will be noted that the cam plate 71 is moved a relatively short distance when the push button 58 is depressed, whereas, the cam plate 71 is moved a relatively large distance when the button 61 is depressed. The difference in movement is obtained by varying the slope of the cam surfaces 72 to 75, inclusive. Preferably, the cam plate 71 is supported by two hangers 77 which are pivoted at their upper ends to the bracket 65 and at their lower ends to the cam plate 71, as shown at 78. The cam plate 71 is biased to the left by means of a tension spring 79, one end of which is fixed and the opposite end of which engages the pivoted lever 67, as shown at 81. The lower end of the lever 67 is connected by means of a pin-and-slot connection 82 to a bellcrank 83 fixed to the shaft 41 and, therefore, movable with the arm 40. The outer end of the bellcrank 83 pivotally supports a pawl 84 which is biased by means of a torsion spring (not shown) into engagement with a ratchet wheel 85.

From the foregoing description, it will be noted that, as the amount of movement imparted to the cam plate 71 varies depending upon which button 58 to 61 is depressed, the amount of movement of the arm 40 about the shaft 41 is varied. Accordingly, the positions of the pivot 44 and trigger 43 are vertically adjusted so that the carriage 22 is released at different times to provide different degrees of toasting. Further reference to this operation appears hereinafter.

The shafts 41 and 54 are driven at relatively low and different speeds by means of the motor-driven mechanism 55, which will now be described. The motor-driven mechanism 55 is supported by a frame 86 which preferably defines the support also for the bracket member 65. A relatively small motor 87 is carried by the bracket 86 in any suitable manner and preferably includes a self-contained speed-reducing mechanism (not shown) which is effective to drive a pinion 88 at relatively low speed. The pinion 88 meshes with a gear 89 fixed to the shaft 54 and rotatable in the direction of the arrow (see Fig. 3). A pinion 91 is also secured to the shaft 54 and is, therefore, rotatable with the gear 89 and ratchet 57 as a unit. The pinion 91 drives a gear 92 in the direction of the arrow (Fig. 3), which gear 92 is fixed to the ratchet 85, as best shown in Fig. 1. The ratchet 85 and gear 92, while carried by the shaft 41, are rotatable relative thereto.

Figure 4:
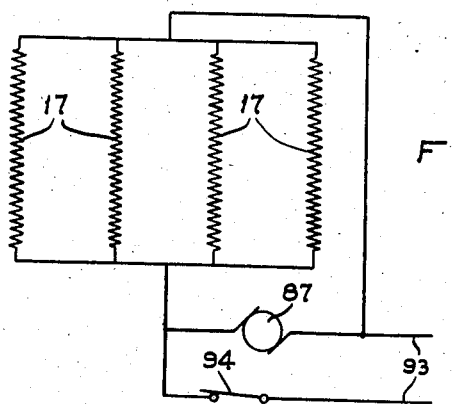
Fig. 4 is a diagram of the electrical connections.

The various heating elements 17 and the motor 87 are connected in parallel to an electric circuit 93 under control of a switch 94 (see Fig. 4). The switch 94 is closed when the carriage 24 is moved to its lower or toasting position and opened when the carriage is in its upper or bread-receiving position, as shown in the drawings. The switch 94, structurally shown in Fig. 2, is carried by the wall 12 and includes a pair of contacts 95 which are supported by resilient members 96. The arrangement is such that the contacts 95 are biased at all times toward their engaged or circuit-closed position. The switch 94 is maintained open only at such times that the carriage is in its upper position, and this operation is effected by a finger 97 carried by the carriage and engageable with the upper resilient member 96.

In operating the toaster described up to now, the bread to be toasted is inserted through the opening 23 and rested upon the supporting member 21. Assuming it is desired to prepare dark, well-done toast, the push button 61 is depressed to impart maximum movement to the cam plate 71, as described heretofore. Movement of the cam plate 71 swings the bellcrank 83 counterclockwise, as viewed in Fig. 3, by means of the lever 67, the pawl 84 riding over the teeth of the ratchet 85 during this movement of the bellcrank 83. As the bellcrank 83 and the arm 40 are tied together by the shaft 41, the arm 40 is swung downwardly and, therefore, lowers the pivot point 44 of the trigger 43. The downward movement of the push button 61 and its push rod 63 swings the latch 33 from beneath the bellcrank 29, as described heretofore. Accordingly, the carriage 22 and the spring 28 fall by gravity to their lowermost position. At this time, of course, the bellcrank 29 is swung clockwise about its pivot 31.

During the downward movement of the carriage 22, the horizontal wall portion 25 thereof engages a curved camming portion 98 of the trigger 43 and causes some slight counterclockwise movement of the trigger 43 about its pivot 44 in opposition to the bias of the spring 46. When the horizontal wall portion 25 passes beneath the projection 45, the spring 46 swings the trigger 43 slightly clockwise for latching the wall portion 25 beneath the projecting portion 45. During the clockwise movement of the bellcrank 29, the pin 33 is swung to the left, out of the path of movement of the pawl 56. The link 51 which moves downwardly with the bellcrank 29, rotates the arm 53 counterclockwise about the shaft 54. At this time, the torsional spring (not shown) moves the pawl 56 into engagement with the ratchet 57 and the pawl at this time rides over the teeth of the ratchet until in its lowermost position. The downward movement of the carriage 22 permits the switch 94 to close so that the heating elements 17 are now energized for toasting the bread. Closure of the switch 94 also energizes the motor 87.

As the gear 89 and the ratchet 57 are rotated by the motor, the arm 53 is driven upwardly by the pawl 56. This movement of the arm 53 forces the link 51 upwardly, which operation swings the bellcrank 29 toward the position shown in the drawings. As the bellcrank 29 approaches its uppermost position, it engages a sloped camming portion 99 formed on the latch 33 and swings the latter counterclockwise about its pivot 34 in opposition to the bias of the spring 36. When the arm 53 reaches its upper dead-center position, the bellcrank 29 will be slightly elevated with respect to the latch 33 so that the latter is swung to the position shown in the drawings by the spring 36. Continued movement of the arm 53 toward the position shown in the drawings lowers the bellcrank 29 slightly until it rests upon the upper surface of the latch 33. Further movement of the arm 53 is prevented by the disengagement of the pawl 56 from the ratchet 57, which operation is effected by the engagement of the pawl 56 with the pin 33, as shown in Fig. 2. It will be understood that during the movement of the bellcrank 29 just recited, the spring 28 is stressed whereby an upward bias is imparted to the carriage 22.

During the rotation of the gear 89 just described, the gear 92 is also rotated but at a slower rate of speed. The spring 28 not only biases the carriage 22 upwardly but because of the latching of the carriage to the lever 38, the spring 28 also biases the lever 38 and the arm 40 upwardly, as viewed in Fig. 2. The speed of movement of the carriage upwardly is governed by the speed of the gear 92, as it will be apparent at this time that the arm 40, the shaft 41, and the bellcrank 83 are clutched to the gear 92 by the pawl 84 and the ratchet 85.

The carriage 22, the lever 38, and the pivot point 44 move slowly upwardly as the gear 92 is rotated. As the left-hand end of the trigger 43, as viewed in Fig. 2, is restrained by the member 47, the trigger 43 moves counterclockwise slowly about its pivot 44 and, therefore, moves the projection 45 out of engagement with the wall portion 25 of the carriage 22. At a predetermined point in the upward movement of the carriage, the trigger 43 releases the carriage and the spring 28 is then effective to move the carriage to its uppermost position. The toasted bread may then be removed through the opening 23. The apparatus is now in the position shown in the drawings and ready for a further operation.

If light toast is required, it will be understood that the button 58 is depressed so that the cam plate 71 and the bellcrank 83 would be moved through a lesser distance than just described. Accordingly, the lever 38 and its pivot point 44 would be positioned at a higher elevation than where the button 61 is depressed. The amount of upward travel of the pivot 44 prior to the tripping of the carriage 22 is, therefore, reduced so that the carriage 22 would, at this time, be in its toasting position for a relatively short period of time. The duration of the toasting period is controlled by the amount of movement imparted to the cam plate 71 and the bellcrank 83. The buttons 59 and 60 provide degrees of toasting which are intermediate the degrees provided by the buttons 58 and 61.

Figure 5:
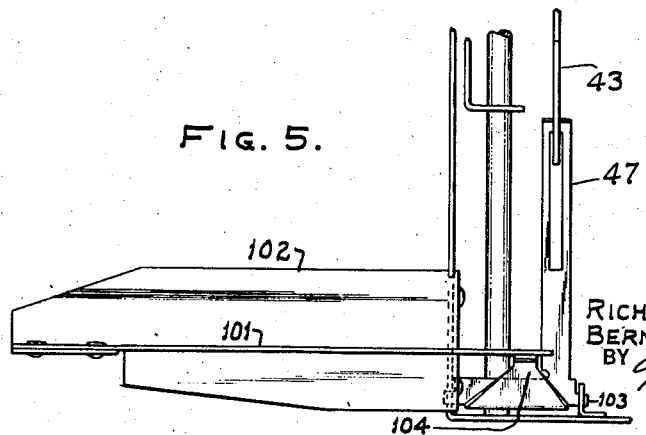
Fig. 5 is a view of a detail viewed from the plane V—V of Fig. 2.

As is well understood, a longer period of time is required to prepare toast when starting with a cold toaster than after an operation thereof. Thermostatically-controlled means is provided for adjusting the angular position of the trigger 43 relative the carriage in response to the temperature within the housing 11, and, accordingly, the point of release in the vertical travel of the carriage is varied. This compensating means is best shown in Fig. 5 and includes a bimetallic element 101 which is supported by a bracket 102 carried by the wall 12. The element 101 deflects downwardly when subjected to heat and swings the restraining member 47 counterclockwise about a pivot 103 by means of a leg 104 forming a part of the restraining member 47. When started from a cold condition, the restraining member 47 is in the position shown in full lines in Fig. 2 so that the trigger 43 and carriage 22 are moved through the maximum vertical travel, determined by the push button which has been depressed before tripping the carriage 22. However, when heated, the restraining member 47 is moved to the broken line position shown in Fig. 2 and, therefore, maintains the left-hand end of the trigger 43 at a lower elevation as shown by broken lines in Fig. 2. Accordingly, the trigger 43 will be effective to trip the carriage earlier in its travel when the toaster is relatively warm than when cold.

From the foregoing description, it will be apparent that we have provided improved means for actuating the carriage of a toaster between its bread-receiving position and its toasting position, in response to actuation of a control mechanism adjustable to selective positions for varying the degree of toasting. The selection of the degree of toasting and the operation of the bread carriage are effected by the single actuation of the control mechanism. When actuated to a selected position, the control mechanism effects downward movement of the bread carriage to its toasting position and adjustment of the motor-driven mechanism whereby the period of time that the carriage is retained in its toasting position is determined. Operation of the motor progressively imparts an upward bias to the carriage and, when the period of toasting has elapsed, the motor-driven mechanism releases the carriage whereby the biasing means is effective to move the carriage to its upper bread-receiving position.

Throughout this specification, we have referred to bread as the substance being toasted, but it will be understood that this term is used in its broadest sense to cover, for example, such products as buns, cakes and crackers.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In an automatic toaster, the combination of a bread carriage movable by gravity from a bread-receiving position to a toasting position, releasable means for retaining said carriage in its bread-receiving position, a motor-driven biasing mechanism for urging the carriage toward its bread-receiving position, releasable means for latching the carriage in its toasting position, a control device manually adjustable to a plurality of selective positions, means responsive to actuation of the control device for releasing said carriage-retaining means, whereby the carriage moves by gravity to its toasting position, means for initiating operation of the motor-driven biasing mechanism in response to actuation of the control device, and means responsive to adjustment of the control device to a selected position for adjusting the latching means and determining the period of time that the carriage is latched in its toasting position.

2. In an automatic toaster, the combination of a bread carriage movable between an upper bread-receiving position and a lower toasting position, a movable member, a spring connecting said member and said bread carriage, a manually-operated control device movable to a plurality of selective positions, means responsive to actuation of the control device to any one of said positions for lowering said bread carriage to its toasting position, releasable means for latching the bread carriage in its toasting position, motor-driven means operated in response to actuation of the control device for moving said member and thereby biasing said spring, means actuated by said motor-driven mechanism for releasing the latching means after a period of operation whereby the bread carriage is moved to its upper bread receiving position by said spring and means responsive to actuation of the control device to a selected position for determining the duration of said period of operation.

3. An automatic toaster including heating means, a bread carriage movable between an upper nontoasting position and a lower toasting position, an adjustable timing device for governing the period of toasting, manually operated means movable to a plurality of selective positions for adjusting the timing device, means responsive to adjustment of the manually operated means to a selected position for moving the bread carriage to its toasting position and for initiating operation of the timing device, means for latching the bread carriage in its toasting position, biasing means interposed between the timing device and the carriage and progressively stressed by the operation of the timing device for urging the bread carriage to its nontoasting position and means actuated by the timing means after the predetermined selected period of operation has elapsed for releasing said latching means whereby the bread carriage is moved to the nontoasting position by the biasing means.

4. An automatic toaster including heating means, a bread carriage movable to an upper nontoasting position and to a lower toasting position, a biasing device supporting said bread carrier, an adjustable timing device, a mechanism supporting the biasing device and driven by the timing device, means manually operable to a plurality of selective positions for adjusting said timing device for various periods of operation, means responsive to operation of the manually-operable means to a selected position for lowering said bread carriage to its toasting position, said biasing device and its supporting mechanism being lowered with said bread carriage independently of the timing device, releasable means for retaining the bread carriage in its toasting position, means for initiating operation of the timing device in response to movement of the bread carriage to its toasting position, said mechanism progressively stressing said biasing device during operation of the timing device, and means actuated by said timing device for releasing said retaining means after the selected period of operation of the timing device has elapsed.

5. An automatic toaster including heating means, a bread carriage movable between an upper nontoasting position and a lower toasting position, an adjustable motor-driven timing device for determining the duration of the period of toasting, means manually adjustable to a plurality of selective positions for adjusting the timing device, means for actuating the bread carriage to the lower toasting position of said carriage in response to actuation of the adjusting means to a selected position, switching means movable to its closed position for energizing the timing device and said heating means in response to movement of the carriage to its toasting position, releasable means for retaining the carriage in its toasting position, means connecting the timing device and the bread carriage and including an extensible spring, the bias of which urges the carriage toward its nontoasting position and which bias is progressively increased during operation of the timing device, and means actuated by the timing device for releasing said retaining means whereby the spring moves the carriage to its nontoasting position, said switching means being actuated to its open position in response to movement of the carriage to its nontoasting position.

6. An automatic toaster including a bread carriage movable between a bread-receiving position and a toasting position, a spring secured to the carriage, adjustable means movable to a plurality of selective positions for lowering the bread carriage and spring to the toasting position of the former, releasable means for latching the carriage in its toasting position, motor-driven means for progressively biasing said spring, means actuated by the motor-driven means for releasing the latching means so that the carriage is moved to its bread-receiving position by said spring and means responsive to actuation of the adjustable means to a selected position for determining the period of time that the carriage is retained in its toasting position by said releasable latching means.

7. An automatic toaster including a carriage for bread to be toasted and movable between a bread-receiving position and a toasting position, adjustable means movable to a plurality of selective positions for varying the degree of toasting, means responsive to operation of the adjustable means for lowering the carriage from its bread-receiving position to its toasting position, releasable means for latching the carriage in its toasting position, a motor-driven mechanism for progressively imposing a bias upon the carriage toward its bread-receiving position, and then releasing said latching means, and means responsive to adjustment of the adjustable means to a selective position for determining the period of time that the carriage is retained in its toasting position.

8. In an automatic toaster, the combination of a bread carriage movable between a nontoasting position and a toasting position, a spring secured to the carriage, a support for carrying said spring, adjustable means movable to a plurality of selective positions for initiating operation of the toaster and for varying the degree of toasting, means actuated in response to adjustment of the adjustable means for lowering said support, spring and carriage to the toasting position of the latter, releasable means for latching the carriage in its toasting position, a motor-driven mechanism for raising said support and thereby progressively increasing the bias of said spring, means actuated by said motor-driven mechanism for releasing said latching means, and means responsive to adjustment of the adjustable means to a selected position for determining the period of time intervening between the latching of the carriage and the releasing of the latching means.

9. In an automatic toaster, the combination of a carriage for bread to be toasted and movable between a nontoasting and a toasting position, a spring secured to the carriage, a pivoted lever supporting said spring, a plurality of push buttons selectively operated for varying the degree of toasting, means responsive to actuation of the push buttons for lowering said lever, spring and carriage to the toasting position of the latter, releasable means for latching the carriage in its toasting position, a motor-driven mechanism for raising said lever and extending said spring, means actuated by said motor-driven mechanism for releasing said latching means, means actuated by the push buttons for adjusting said latching means, the construction being such that the period of time intervening between the latching of the carriage and the releasing of the latching means is varied, switching means controlling energization of the motor-driven mechanism, means for closing said switch in response to adjustment of the push buttons and means for opening said switch in response to movement of the carriage to its nontoasting position.

10. In an automatic toaster, the combination of a casing defining a toasting oven, a bread carriage arranged within the oven and movable between a non-toasting position and a toasting position, a spring attached to the carriage, a support for said spring, adjustable means movable to a plurality of positions for initiating operation of the toaster and for varying the degree of toasting, means actuated in response to adjustment of the adjustable means for lowering said support, spring and carriage to the toasting position of the latter, releasable means for latching the carriage in its toasting position, a motor-driven mechanism for raising said support and thereby progressively increasing the bias of said spring, means actuated by said motor-driven mechanism for releasing said latching means, means responsive to adjustment of the adjustable means to a selected position for determining the period of time intervening between the latching of the carriage and the releasing of the latching means and thermostatic means for varying said period of time inversely with changes in temperature within said oven.

11. In an automatic toaster, the combination of a carriage for bread to be toasted and movable between a nontoasting and a toasting position, a support, a spring connecting the support and carriage, a plurality of push buttons selectively operated for varying the degree of toasting, means responsive to actuation of the push buttons for lowering said support, spring and carriage to the toasting position of the latter, releasable means for latching the carriage in its toasting position, a motor-driven mechanism for raising said support and progressively increasing the bias of said spring, means actuated by said motor-driven mechanism for releasing said latching means, means actuated by the push buttons for adjusting said latching means, so that the period of time intervening between the latching of the carriage and the releasing of the latching means is varied, a switch controlling energization of the motor-driven mechanism and biased at all times toward its closed position, and means associated with the carriage for opening said switch when the carriage is in its nontoasting position.

12. In an automatic toaster, the combination of a carriage for bread or the like and movable between a bread-receiving position and a toasting position, a motor-driven timing device having a shaft rotatable at relatively low speed, a control mechanism adjustable to a plurality of selective positions for varying the degree of toasting of the bread, means responsive to adjustment of the control mechanism for actuating the carriage to its toasting position and for initiating operation of the timing device, means for latching the carriage in its toasting position, adjustable pawl and ratchet means driven by said slow speed shaft for unlatching said latching means after a period of operation of the timing motor, means responsive to movement of the control mechanism to its selective positions for adjusting said pawl and ratchet means whereby said period of operation of the timing motor is varied and thermostatically-operated means for adjusting said latching means independently of said pawl and ratchet means.

13. In an automatic toaster, the combination of a carriage for bread or the like and movable between bread-receiving and toasting positions, a motor-driven timing mechanism having a pair of driven shafts one of which rotates at a higher speed than the other, a control mechanism adjustable selectively to a plurality of positions for varying the degree of toasting of the bread, a spring secured to the carriage, means responsive to adjustment of the control mechanism for effecting movement of the carriage and spring to the toasting position of the former, latching means for holding the carriage in its toasting position, means driven by said higher speed shaft of the timing mechanism for stressing said spring, means driven by said lower speed shaft of the timing mechanism for releasing said latching means and affording movement of the carriage to its bread-receiving position by the bias of the spring, and means responsive to adjustment of the control mechanism to its selective positions for adjusting said latch-releasing means so that the period of time the carriage is retained in its toasting position is varied.

RICHARD I. FELVER.
BERNARD F. PARR.